US006704571B1

United States Patent
Moon

(10) Patent No.: US 6,704,571 B1
(45) Date of Patent: Mar. 9, 2004

(54) REDUCING DATA LOSS DURING CELL HANDOFFS

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 435 days.

(21) Appl. No.: 09/690,772

(22) Filed: Oct. 17, 2000

(51) Int. Cl.[7] ................................................. H04Q 7/20
(52) U.S. Cl. ....................... 455/436; 455/437; 455/439; 370/331; 370/332; 380/247; 380/255; 380/270
(58) Field of Search ................................. 455/436, 437, 455/438, 439, 440, 441, 442, 443; 370/331, 332, 333, 334; 380/247, 255, 270

(56) References Cited

U.S. PATENT DOCUMENTS

| | | | | |
|---|---|---|---|---|
| 5,566,001 A | * | 10/1996 | Saidi et al. | 358/426.02 |
| 5,864,578 A | * | 1/1999 | Yuen | 375/143 |
| 6,018,662 A | * | 1/2000 | Periyalwar et al. | 455/442 |
| 6,112,244 A | * | 8/2000 | Moore et al. | 709/228 |
| 6,175,734 B1 | * | 1/2001 | Desgagne et al. | 455/437 |
| 6,192,029 B1 | * | 2/2001 | Averbuch et al. | 370/229 |
| 6,205,129 B1 | * | 3/2001 | Esteves et al. | 370/331 |
| 6,208,620 B1 | * | 3/2001 | Sen et al. | 370/231 |
| 6,219,343 B1 | * | 4/2001 | Honkasalo et al. | 370/335 |
| 6,233,231 B1 | * | 5/2001 | Felix et al. | 370/335 |
| 6,353,907 B1 | | 3/2002 | van Nobelen | 714/746 |
| 6,415,410 B1 | | 7/2002 | Kanerva et al. | 714/749 |
| 6,532,563 B2 | | 3/2003 | Nobelen | 714/751 |
| 6,567,375 B2 | | 5/2003 | Balachandran et al. | 370/204 |

* cited by examiner

Primary Examiner—William Trost
Assistant Examiner—Stephen D'Agosta
(74) Attorney, Agent, or Firm—Baker Botts L.L.P.

(57) ABSTRACT

In a wireless communications system, mobile units establish data communications sessions using wireless links having negotiated transmission parameters. To reduce data loss during handoffs of the wireless data communications sessions, transmission parameters are renegotiated upon detecting an imminent handoff.

23 Claims, 2 Drawing Sheets

US 6,704,571 B1

REDUCING DATA LOSS DURING CELL HANDOFFS

TECHNICAL FIELD OF THE INVENTION

The present invention relates generally to wireless communications and more particularly to reducing data loss during cell handoffs.

BACKGROUND OF THE INVENTION

Because users of cellular telephones often travel while carrying on communications sessions, cellular radio systems support handoffs of ongoing sessions between cells. This allows a cellular phone user to start a session in one cell and continue the same session while traveling through any number of other cells. During transitions between cells, some of the information associated with a communications session may be lost. Because cellular systems handle primarily voice communications, these small gaps of information have not been perceived as a significant problem, since small losses may be imperceptible to the participants in a voice communications session. However, in data communications, small losses of information during transitions between cells may adversely impact data communications and reduce data throughput. Moreover, in an attempt to increase data throughput for data communications sessions, some wireless communication protocols sacrifice some of the control channels to make room for session data. However, this decrease in control aggravates problems of data loss associated with transitioning between cells.

SUMMARY OF THE INVENTION

In accordance with the present invention, techniques for reducing data loss during handoffs are provided which substantially eliminate or reduce disadvantages and problems associated with previous techniques. In a particular embodiment, the present invention satisfies a need for a communications control technique that, upon detecting an imminent handoff, reduces the window size of transmissions to reduce or eliminate packet loss during the handoff.

According to one embodiment of the present invention, a method for reducing data loss in wireless communications communicates data associated with a communications session between a mobile unit and a first base station. The method communicates the data using first transmission parameters that include a first window size. The method determines an imminent transmission of the communications session from the first base station to a second base station and, in response to determining the imminent transition, communicates data between the mobile unit and the first base station using second transmission parameters. The second transmission parameters include a second window size smaller than the first window size to reduce data loss during the transition from the first base station to the second base station.

In accordance with another embodiment of the present invention, a mobile unit includes an interface that transmits data associated with a communications session. The interface transmits the data using first transmission parameters that include a first window size. The mobile unit also includes a controller that determines an imminent transmission of the communications session from the first base station to a second base station and, in response to determining the imminent transmission, requests second transmission parameters for transmissions to the first base station. The second transmission parameters include a second window size smaller than the first window size to reduce data loss during the transition from the first base station to the second base station.

The invention provides a number of technical advantages. Using these techniques, communications systems can reduce or eliminate packet loss during handoffs. By modifying transmission parameters, such as a window size and code book, systems may limit the amount of data that can be lost during a handoff. For example, by reducing a transmission window size before a handoff between base transceiver stations, the system reduces the maximum number of packets that can be lost before the loss is detected. Therefore, the system can reduce or eliminate communications delays resulting from detection and retransmission of packets lost during handoffs.

Reducing packet loss during handoffs also provides other advantages. For example, reducing losses due to an unreliable medium (wireless communications) prevents packet communications protocols from interpreting those losses as congestion. That is, some protocols, such as transmission control protocol (TCP), are based on an assumption that the underlying media for communications are relatively reliable. Therefore, in these protocols, packet losses are attributed to congestion, which may cause these protocols to reduce throughput. In addition, reducing packet loss during handoffs allows wireless communications systems to more readily facilitate "connectionless" services, such as user datagram protocol (UDP) that rely on an underlying reliability of the media used for communications.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
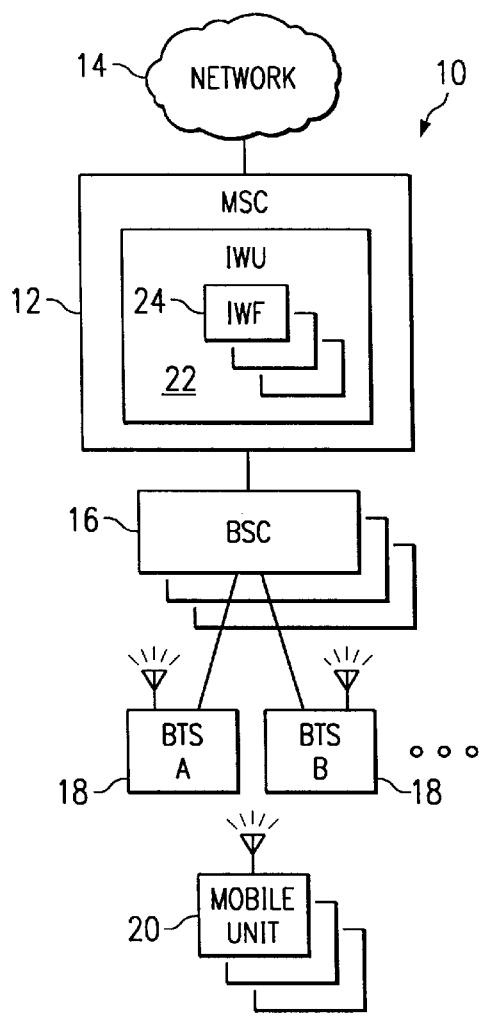
FIG. 1 illustrates a system having devices that modify transmission parameters to reduce data loss during handoffs.

FIG. 1 illustrates a communications system, indicated generally at 10, that includes a mobile switching center (MSC) 12 coupled to a network 14 and base station controllers 16. Controller 16 couples to base transceiver stations 18, which provide wireless communications services for mobile units 20. In general, mobile unit 20 establishes communications sessions by wirelessly coupling to stations 18. To reduce data loss when roaming between stations 18, mobile unit 20 and other elements of system 10 negotiate various transmission parameters to reduce packet loss during transitions between stations 18. More specifically, mobile unit 20 may request a reduced window size for transmissions to station 18 upon detecting an imminent handoff between stations 18.

Mobile units 20 provide wireless communications for voice, data, video, signaling, control, or other transmissions using any suitable wireless communications protocols by establishing wireless links with stations 18. Mobile units 20 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information using any suitable wireless communications protocols.

Stations 18 represent hardware and/or software supporting wireless links with mobile units 20 using any suitable packet-switched or circuit-switched, wireless communications protocols. Controllers 16 manage wireless resources for one or more stations 18. For example, controller 16 may manage channel setup, frequency hopping, handoffs, and other suitable functions for stations 18. In addition, controllers 16 provide a link coupling stations 18 with MSC 12. MSC 12 operates as a switching node for communications system 10. For example, MSC 12 may operate as a switching node of the public switched telephone network (PSTN). In addition, MSC 12 supports mobile units 20 by providing functions such as registration, authentication, location updating, handoffs, and call routing to roaming mobile units 20. MSC 12 provides access to other communications devices by coupling with network 14. To support connections between mobile units 20 and network 14, MSC 12 includes an interworking unit (IWU) 22 that provides interworking functions (IWFs) 24. Each IWF 24 translates between wireless protocols used for communications with mobile units 20 and protocols used for communications with other devices in or connected to network 14.

Network 14 represents any collection and arrangement of hardware and/or software supporting communications between multiple devices. For example, network 14 may be one or a collection of components associated with the PSTN, local area networks (LANs), wide area networks (WANs), a global computer network such as the Internet, or other suitable ground-based or satellite-based, wireline or wireless communications technology that supports communications between multiple devices.

In operation, mobile unit 20 may establish a data communications session with station 18. In establishing the data communication session, mobile unit 20 and MSC 12 negotiate transmission parameters, such as window sizes and code books, designed to maximize data throughput during the session. In general, the window size specifies the number of frames or packets to send before receiving an acknowledgement, and a code book provides a method for sending long strings of data using shorthand symbols. During negotiation, mobile unit 20 requests parameters specifying values such as a window size and code book size for transmissions to station 18. Similarly, MSC 12 requests parameters for transmissions from station 18 to mobile unit 20. Mobile unit 20 and MSC 12 acknowledge by accepting the transmission parameters as requested or agreeing to lower transmission parameters. For example, MSC 12 may request transmission parameters outside of the capabilities of mobile unit 20. In response, mobile unit 20 agrees to transmission parameters that it can support. However, mobile unit 20 may not agree to transmission parameters that exceed those requested. Thus, for example, upon receiving a request for a window size of thirty frames, mobile unit 20 may not agree to a window size greater than thirty frames, but may agree to a window size of less than thirty frames.

During a data communications session, mobile unit 20 and station 18 may use reduced control signaling to provide increased data throughput. However, this reduced control signaling, while increasing data throughput, may sacrifice functions, such as power control, that facilitate smooth handoffs. This can result in dropped or lost packets during handoffs. For example, multiple frames of packets may be lost during a handoff. These packet losses can result in significant delays in communications. For example, with a window size of thirty frames, the loss of a window during a handoff may result in a delay on the order of thirty seconds.

In addition, code books used for communicating strings of information using symbols may also be lost during handoffs. Code books, used for communications between mobile unit 20 and station 18, allow blocks of commonly transmitted information to be communicated using shorthand symbols. For example, a communication from mobile unit 20 to station 18 may include a symbol indicating an entry in a code book maintained by station 18. Station 18, by accessing the indicated entry in the code book, determines the actual information for communication to controller 16. However, because station 18 typically maintains the code book, the code book is lost after handoff to a new station 18. Thus, while these code books provide for increased throughput on wireless links between mobile units 20 and stations 18, the loss of a code book during cell handoff can exacerbate data loss problems, resulting in longer delays in data communications.

To reduce data loss during handoffs, mobile unit 20, MSC 12, or other appropriate elements of system 10 modify transmission parameters, such as window sizes and code books, prior to handoffs. For example, consider mobile unit 20 having a data communications session established via a wireless link with station 18 labeled A (station A). To provide maximum data throughput during normal communications, mobile unit 20 may use a large window size and a code book providing a high level of compression. However, to prevent significant delays caused by packet loss during a handoff, mobile unit 20 may modify these transmission parameters in anticipation of the handoff. Thus, if mobile unit 20 detects an imminent transition of the communications session from station A to station B, mobile unit 20 may request to reduce the window size and to modify the code book used for transmissions. Thus, in the event that packets are lost during the handoff between station A and station B, fewer packets containing less compressed information can be lost. After handoff from station A to station B, the reduced window size and code book may hinder data throughput. Therefore, after handoff, mobile unit 20 may renegotiate for a larger window size and code book to resume a high level of data throughput.

These techniques allow devices to independently monitor transmissions and modify transmission parameters to reduce data loss. Thus, while features such as fine-grained power control between stations 18 and mobile units 20 may not be available during a data communications session, mobile unit 20 and MSC 12 may take steps to reduce or eliminate data loss during handoff. For example, mobile unit 20 may monitor signals received from station 18 and, upon detecting an imminent cell handoff, independently request a modification in the parameters for transmissions to station 18. As previously discussed, this request prompts MSC 12 to respond by accepting the modified transmission parameters (or lower parameters). Thus, by requesting reduced transmission parameters, mobile unit 20 can reduce the amount of data that can be lost during handoff.

However, the reduced transmission parameters requested by mobile unit 20 affect only transmission from mobile unit 20 to station 18. Therefore, MSC 12 may also detect an imminent handoff of mobile unit 20 and request modified transmission parameters for communications from station 18 to mobile unit 20. Upon receiving the request, mobile unit 20 responds by accepting the modified transmission parameters proposed by MSC 12 (or lower parameters). Therefore, through bi-directional negotiation, MSC 12 and mobile unit 20 can reduce data loss for communications both to and from mobile unit 20.

To detect an imminent handoff, mobile unit 20 and MSC 12 may monitor any appropriate signals. For example, mobile unit 20 may monitor signal strength of transmissions received from station 18. When the signal strength drops below a threshold for some period of time, mobile unit 20 may assume that a transition to a second station 18 is imminent and request modified transmission parameters, such as a reduced window size and code book. Alternatively, mobile unit 20 may rely on other elements in system 10 to detect and respond to imminent cell handoff before requesting reduced transmission parameters. That is, upon receiving a request for reduced parameters for transmissions from station 18, mobile unit 20 may respond by requesting reduced parameters for transmissions to station 18. Similarly, MSC 12 may monitor signals received by station 18 from mobile unit 20 to detect an imminent handoff, or MSC 12 may rely on other elements in system 10 to detect the imminent transition and request modified transmission parameters.

While these examples indicate a single reduction in transmission parameters prior to handoff, system 10 contemplates devices using a series of modifications to transmission parameters designed to maintain a high level of data throughput while accounting for the probability of a handoff between stations 18. Thus system 10 may attempt to strike a balance between data throughput and integrity. For example, as the signal strength for transmissions received from station 18 decreases, mobile unit 20 may gradually reduce the window size for transmissions through a series of negotiations of transmission parameters. Thus, as the probability of a cell handoff increases, the amount of data that may be lost during that handoff decreases. However, system 10 contemplates mobile unit 20 and MSC 12 using any number of negotiations of transmission parameters before and after handoffs to maintain high levels of data throughput while protecting against data loss during handoffs.

Moreover, while these examples focus on handoffs between stations 18, these techniques may be applied for any different type of handoff. For example, these techniques may be used for transitions between different channels (time slots) in the same cell, for transitions between cells under the control of the same controller 16, for transitions between cells under the control of different controllers 16 but belonging to the same MSC 12, and for transitions between cells under the control of different MSCs 12.

Figure 2:
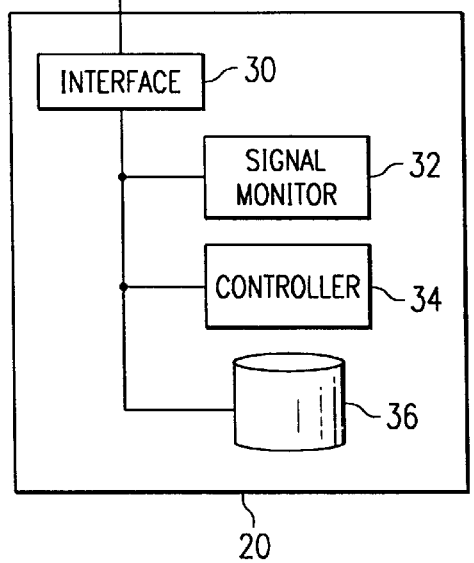
FIG. 2 is a block diagram illustrating components of a mobile unit capable of modifying transmission parameters to reduce data loss.

FIG. 2 illustrates functional components of an exemplary mobile unit 20 having an interface 30, a signal monitor 32, a controller 34, and a memory 36. In general, mobile unit 20 supports data communications sessions and modifications in transmission parameters during these sessions to reduce data loss during handoffs. More specifically, to prevent the loss of data, mobile unit 20 may reduce the window size and modify the code book for transmissions to station 18 upon detecting an imminent handoff.

Interface 30 couples mobile unit 20 to remote devices, such as stations 18, using any suitable wireless communications protocols. Signal monitor 32 allows mobile unit 20 to monitor transmissions received from other devices. For example, signal monitor 32 may determine signal strength for transmissions received from stations 18. Controller 34 manages the operation of components in mobile unit 20. For example, controller 34 may be a processor executing software maintained by memory 36. Memory 36 stores information for providing wireless communications services in addition to other features and functions for users. For example, memory 36 may store software, code books for interpreting transmissions received from remote devices, code books for transmissions to remote devices, thresholds for determining when to renegotiate transmission parameters, subscriber identification information for establishing communications sessions, phone books, and other appropriate information.

In operation, mobile unit 20 establishes data communications sessions using wireless links between interface 30 and stations 18. In establishing a session, mobile unit 20 negotiates transmission parameters, such as window sizes and code books, designed to maximize data throughput during the session. During the session, mobile unit 20 monitors transmissions from stations 18 to determine characteristics such as signal strength. Using the signal information obtained by signal monitor 32, controller 34 detects an imminent transition of the communications session between stations 18. For example, controller 34 may detect an imminent cell handoff by determining that the signal strength for transmissions received from station 18 has fallen below a threshold for a predetermined period of time. Alternatively, controller 34 may detect an imminent cell handoff by receiving a request for modified transmission parameters from MSC 12. However, system 10 contemplates mobile unit 20 using any suitable techniques for detecting an imminent handoff.

As previously discussed, mobile unit 20, upon detecting an imminent handoff, requests modified transmission parameters designed to minimize data loss during a handoff or, alternatively, gradually reduces transmission parameters through a series of renegotiations. After a handoff occurs (or if mobile unit 20 determines that a handoff is no longer imminent), mobile unit 20 renegotiates the transmission parameters to resume a high level of data throughput. As with the reductions to the parameters, mobile unit 20 may use one or more negotiations of the parameters.

While this illustration includes specific functional elements for mobile unit 20, system 10 contemplates mobile unit 20 containing any collection and arrangement of elements. Moreover, system 10 contemplates implementing each of the functional elements within mobile unit 20 using any suitable combination and arrangement of hardware and/or software and implementing any of the functionalities using a computer program stored on a computer readable medium.

Figure 3:
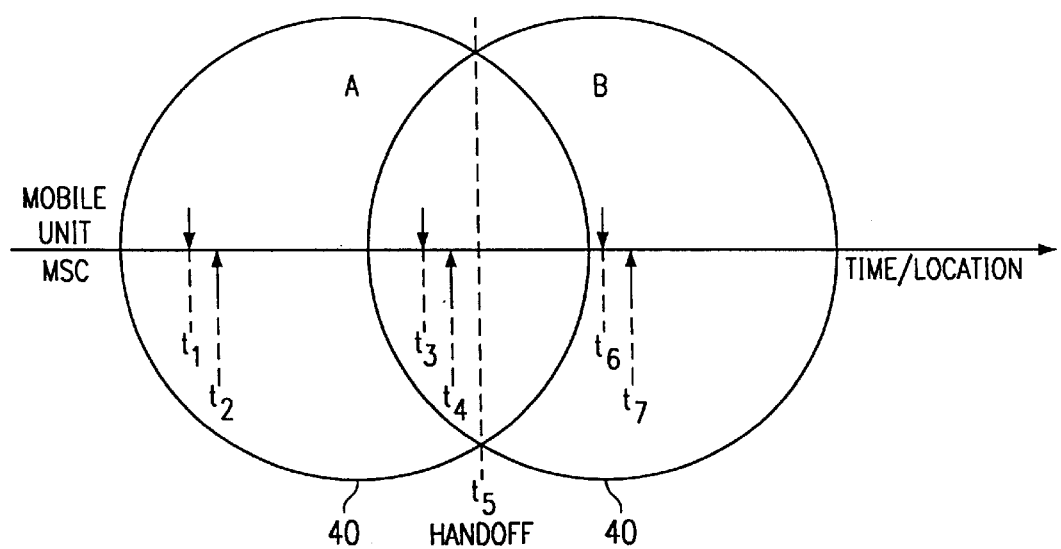
FIG. 3 is a timeline overlaid on a diagram of cell boundaries illustrating modifications of transmission parameters during movement between cells.

FIG. 3 is a timeline tracing the location of mobile unit 20 traveling between cells 40 serviced by stations 18. This illustration includes two cells 40 labeled A and B (cell A and cell B). The arrows along the upper edge of the timeline, at times t1, t3, and t6, represent requests for transmission parameters communicated from mobile unit 20 to MSC 12. The arrows along the bottom edge of the timeline, at times t2, t4 and t7, represent requests for transmission parameters communicated from MSC 12 to mobile unit 20. In general, this timeline illustrates the negotiations of transmission parameters between mobile unit 20 and MSC 12 as mobile unit 20 transitions between cell A and cell B.

While within cell A, mobile unit 20 establishes a data communications session, requests transmission parameters for transmissions to station 18 at time t1, and receives a request for transmission parameters from MSC 12 at time t2. As mobile unit 20 moves through cell A, controller 34 monitors signals, for example, using signal monitor 32, to detect signals that indicate a potential handoff between cells. As previously discussed, mobile unit 20 may use any suitable criteria for determining an imminent handoff, such as drops in signal strength, detection of signals from alternate stations 18, requests for modifications of transmission parameters from MSC 12, or other suitable indications.

Upon detecting an imminent transition between cells, mobile unit 20 requests modified transmission parameters to reduce data loss during handoff. Thus, at time t3, mobile unit 20 requests transmission parameters that may include a reduced window size and modified or reduced code book designed to minimize data loss during a handoff between cell A and cell B. In response to this request or in response to independently detecting the imminent transition of mobile unit 20 between cells, MSC 12, at time t4, requests modified transmission parameters also designed to reduce data loss during cell handoff. Therefore, before handoff between cell A and cell B, mobile unit 20 requests modified transmission parameters for transmissions to station 18, and MSC 12 requests modified transmission parameters for transmissions from station 18 to mobile unit 20.

At time t5, mobile unit 20 transitions between cell A and cell B. That is, station A hands off the data communications session established by mobile unit 20 to station B. After moving sufficiently within the range of station B, mobile unit 20 and MSC 12 may renegotiate transmission parameters to increase data throughput. Thus, at time t6, mobile unit 20 requests modified transmission parameters, for example, to resume use of the original window size and code book. Either independently or in response to the request from mobile unit 20, MSC 12, at time t7, also requests modified transmission parameters. Using this method, some data throughput is sacrificed before handoffs, yet this sacrifice in throughput may reduce or eliminate data loss during handoffs. Because of this reduction, the method may reduce or eliminate communications delays and prevent upper level communications protocols from improperly identifying packet loss as congestion. Therefore, using these techniques, overall data throughput may be increased over previous techniques.

While this timeline illustrates mobile unit 20 and MSC 12 requesting modified transmission parameters at specific locations and in specific orders, system 10 contemplates mobile unit 20 and MSC 12 negotiating modified transmission parameters at any appropriate times to reduce data loss during cell handoffs while attempting to maximize data throughput. Moreover, mobile unit 20 and MSC 12 need not both negotiate modified transmission parameters to reduce data loss. For example, mobile unit 20 may request modified transmission parameters before a cell handoff while MSC 12 maintains constant transmission parameters at all times. While this would result in reduced data loss for transmissions only from mobile unit 20 to station 18, such an approach may be appropriate, for example, for data communications sessions involving intense data communications from mobile unit 20. Similarly, mobile unit 20 may maintain constant transmission parameters while MSC 12 negotiates modified transmission parameters to reduce data loss during cell handoffs. Thus, system 10 contemplates mobile unit 20 and MSC 12 using any suitable criteria, thresholds, and methods for renegotiating transmission parameters during a data communications session to reduce data loss during handoffs.

Figure 4:
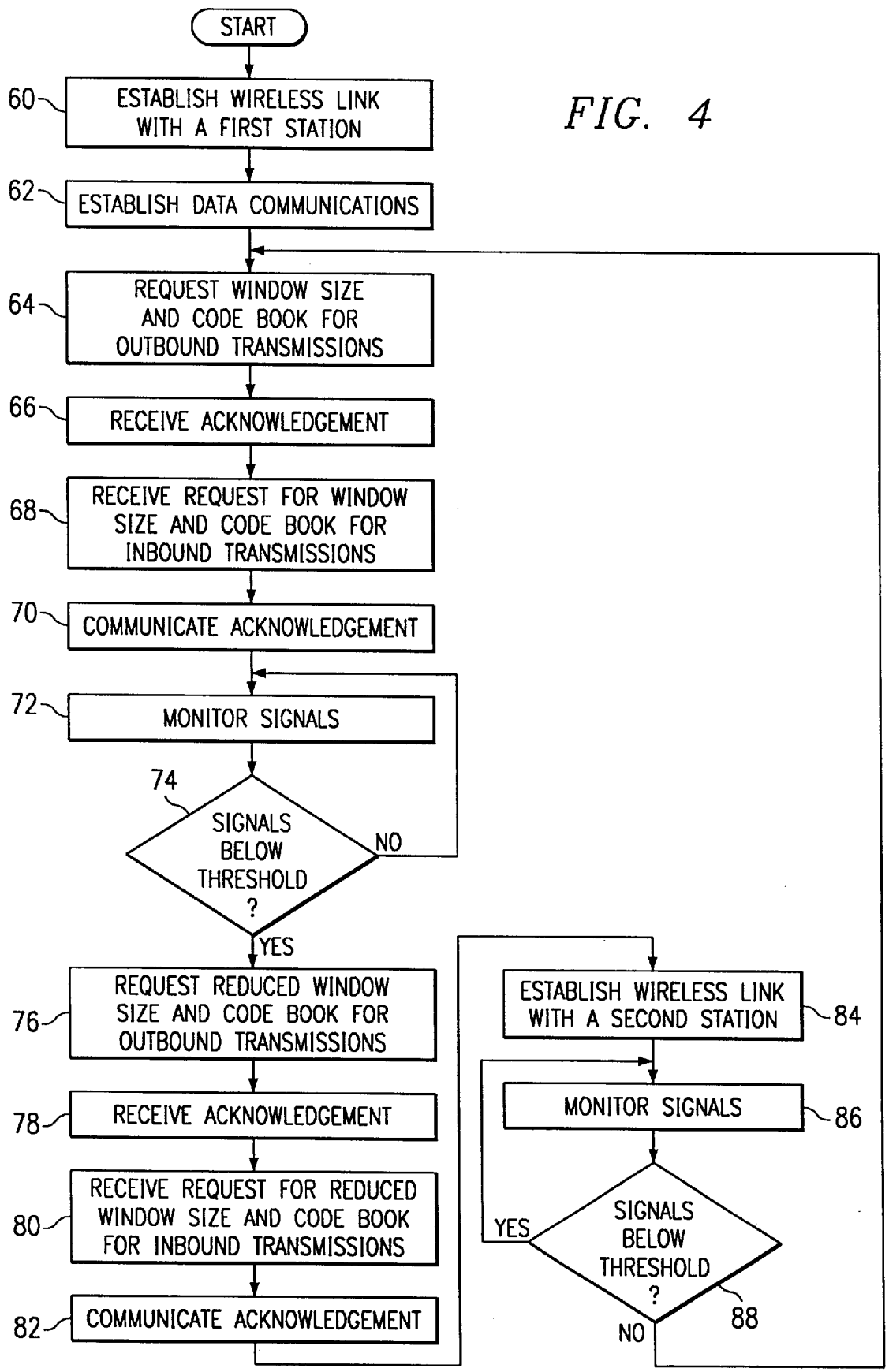
FIG. 4 is a flowchart illustrating a method for modifying transmission parameters to reduce data loss during cell handoffs.

FIG. 4 is a flowchart illustrating a method for establishing a data communications session and modifying transmission parameters during the session to reduce data loss during a cell handoff. Mobile unit 20 establishes a wireless link with a first station 18 and establishes a data communications session using that wireless link at steps 60 and 62. In establishing the data communications session, mobile unit 20 requests a window size and code book for outbound transmissions to station 18 at step 64 and receives an acknowledgment including the window size and code book to use for outbound transmissions at step 66. Mobile unit 20 receives a request for a window size and code book for inbound transmissions from station 18 at step 68 and communicates an acknowledgment including the window size and code book for inbound transmissions at step 70. Thus, steps 64–70 represent a negotiation between mobile unit 20 and MSC 12 establishing transmission parameters for transmissions to and from mobile unit 20.

During the communications session, mobile unit 20 monitors signals using criteria such as signal strength at step 72 and determines whether these signals have fallen below a threshold at step 74. If not, mobile unit 20 continues monitoring signals at step 72. However, if the signals drop below a threshold, mobile unit 20 and MSC 12 renegotiate the window size and code book for communications to and from mobile unit 20. Thus, mobile unit 20 requests a reduced window size and code book for outbound transmissions at step 76 and receives an acknowledgment at step 78. Mobile unit 20 receives a request for reduced window size and code book for inbound transmissions at step 80 and communicates and an acknowledgment at step 82.

To transition between stations 18, mobile unit 20 establishes a wireless link with a second station 18 at step 84. After handoff from the first station 18 to the second station 18, mobile unit 20 monitors signals at step 86 and determines whether these signals remain below a threshold at step 88. While the signals remain below the threshold, mobile unit 20 continues monitoring the signals at step 86 and communicating using the reduced transmission parameters negotiated at steps 76–82. However, if the signals are no longer below the threshold, mobile unit 20 and MSC 12 renegotiate for increased transmission parameters at steps 64–70. Thus, using these steps, mobile unit 20 and MSC 12 modify transmission parameters before and after a cell handoff to reduce data loss during the handoff while maintaining a high data throughput at other times.

While this flowchart illustrates a method containing specific steps in a particular order, system 10 contemplates many of the steps in this flowchart taking place simultaneously and/or in different orders than as shown. Moreover, system 10 contemplates devices using methods containing additional steps, fewer steps, and different steps so long as the methods remain appropriate for modifying transmission parameters to reduce data loss during handoffs.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for reducing data loss in wireless communications comprising:

communicating data with a first base station using first transmission parameters that comprise a first window size and a first code book for encoding data, wherein the data is associated with a communications session;

detecting an imminent transition of the communications session from the first base station to a second base station; and in response to detecting the imminent transition, requesting second transmission parameters for communications to the first base station, the second transmission parameters comprising a second window size smaller than the first window size and further comprising a second code book for encoding data, wherein the size of the second code book is smaller than the size of the first code book, the request for the second transmission parameters to reduce data loss during the transition from the first base station to the second base station.

2. The method of claim 1, wherein the communications session comprises an Internet protocol (IP) communications session.

3. The method of claim 1, wherein detecting the imminent transition comprises determining that a signal strength from the first base station has fallen below a threshold for a predetermined period of time.

4. The method of claim 1, further comprising:

transitioning the communications session from the first base station to the second base station; and requesting third transmission parameters for communications to the second base station, the third transmission parameters comprising a third window size greater than the second window size.

5. The method of claim 1, wherein detecting the imminent transition comprises detecting a request for a new window size for transmissions from the first base station.

6. A mobile unit comprising:

an interface operable to communicate data with a first base station using first transmission parameters that comprise a first window size and a first code book for encoding data, wherein the data is associated with a communications session; and a controller operable to detect an imminent transition of the communications session from the first base station to a second base station and, in response to detecting the imminent transition, to request second transmission parameters for transmissions to the first base station, the second transmission parameters comprising a second window size smaller than the first window size and further comprising a second code book for encoding data, wherein the size of the second code book is smaller than the size of the first code book, the request for the second transmission parameters to reduce data loss during the transition from the first base station to the second base station.

7. The mobile unit of claim 6, wherein the communications session comprises an Internet protocol (IP) communications session.

8. The mobile unit of claim 6, wherein the controller is further operable to detect the imminent transition by determining that a signal strength from the first base station has fallen below a threshold for a predetermined period of time.

9. The mobile unit of claim 6, wherein:

the interface is further operable to transition the communications session from the first base station to the second base station; and the controller is further operable to request third transmission parameters for communications to the second base station, the third transmission parameters comprising a third window size greater than the second window size.

10. The mobile unit of claim 6, wherein:

the interface is further operable to receive an incoming request for a new window size for transmissions from the base station; and the controller is further operable to detect the imminent transition by detecting the incoming request and to request the second transmission parameters in response to the incoming request.

11. A mobile switching center operable to:

negotiate first transmission parameters for transmissions of data from a first base station to a mobile unit, wherein the first transmission parameters comprise a first window size for transmissions of data to the mobile unit from the first base station and a first code book for encoding data, the data associated with a communications session;

detect an imminent transition of the communications session from the first base station to a second base station; and in response to detecting the imminent transition, request second transmission parameters for transmissions of data from the first base station to the mobile unit, wherein the second transmission parameters comprise a second window size for transmissions smaller than the first window size, and further in response to detecting the imminent transition to modify a code book used for encoding transmissions from the first base station to the mobile unit from the first codebook to a second codebook.

12. The mobile switching center of claim 11, further operable to detect the imminent transition by detecting a request for reduced transmission parameters received from the mobile unit.

13. The mobile switching center of claim 11, wherein the communications session comprises an Internet protocol (IP) communications session.

14. Software for reducing data loss in wireless communications, the software embodied on a computer readable medium and operable to:

communicate data with a first base station using first transmission parameters that comprise a first window size and a first code book for encoding data, wherein the data is associated with a communications session;

detect an imminent transition of the communications session from the first base station to a second base station; and in response to detecting the imminent transition, request second transmission parameters for communications to the first base station, the second transmission parameters comprising a second window size smaller than the first window size and further comprising a second code book for encoding data, wherein the size of the second code book is smaller than the size of the first code book, the request for the second transmission parameters to reduce data loss during the transition from the first base station to the second base station.

15. The software of claim 14, wherein the communications session comprises an Internet protocol (IP) communications session.

16. The software of claim 14, further operable to detect the imminent transition by determining that a signal strength from the first base station has fallen below a threshold for a predetermined period of time.

17. The software of claim 14, further operable to:

transition the communications session from the first base station to the second base station; and request third transmission parameters for communications to the second base station, the third transmission parameters comprising a third window size greater than the second window size.

18. The software of claim 14, further operable to detect the imminent transition by detecting a request for a new window size for transmissions from the first base station.

19. A mobile unit comprising:

means for communicating data with a first base station using first transmission parameters that comprise a first window size and a first code book for encoding data, wherein the data is associated with a communications session;

means for detecting an imminent transition of the communications session from the first base station to a second base station; and means for, in response to detecting the imminent transition, requesting second transmission parameters for communications to the first base station, the second transmission parameters comprising a second window size smaller than the first window size and further comprising a second code book for encoding transmissions, wherein the size of the second code book is smaller than the size of the first code book, the request for the second transmission parameters to reduce data loss during the transition from the first base station to the second base station.

20. The mobile unit of claim 19, wherein the communications session comprises an Internet protocol (IP) communications session.

21. The mobile unit of claim 19, wherein the means for detecting the imminent transition comprises means for determining that a signal strength from the first base station has fallen below a threshold for a predetermined period of time.

22. The mobile unit of claim 19, further comprising:

means for transitioning the communications session from the first base station to the second base station; and means for requesting third transmission parameters for communications to the second base station, the third transmission parameters comprising a third window size greater than the second window size.

23. The mobile unit of claim 19, wherein the means for detecting the imminent transition comprises means for detecting a request for a new window size for transmissions from the first base station.

* * * * *